US011426921B2

(12) United States Patent
Milesi et al.

(10) Patent No.: US 11,426,921 B2
(45) Date of Patent: *Aug. 30, 2022

(54) PREFORM HEATING DEVICE

(71) Applicant: SMI S.P.A, Bergamo (IT)

(72) Inventors: Giovanni Milesi, Bergamo (IT); Ivan Cortinovis, Bergamo (IT); Edgar Fischer, Bergamo (IT)

(73) Assignee: SMI S.P.A., Bergamo (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,101

(22) Filed: Jan. 22, 2021

(65) Prior Publication Data

US 2021/0229338 A1     Jul. 29, 2021

(30) Foreign Application Priority Data

Jan. 24, 2020   (IT) .................. 102020000001360

(51) Int. Cl.
*B29C 49/68*      (2006.01)
*B29C 49/42*      (2006.01)

(52) U.S. Cl.
CPC ......... *B29C 49/68* (2013.01); *B29C 49/4205* (2013.01); *B29C 49/4236* (2013.01)

(58) Field of Classification Search
CPC ............... B29C 49/68; B29C 49/6418; B29C 2035/0822; B29C 49/4236; B29C 49/4205

See application file for complete search history.

(56) References Cited

U.S. PATENT DOCUMENTS

| | | | | |
|---|---|---|---|---|
| 3,975,618 A | * | 8/1976 | Goos ..................... | B29B 13/024 392/419 |
| 8,303,290 B2 | * | 11/2012 | Feuilloley ............. | B29B 13/024 425/526 |
| 10,857,722 B2 | * | 12/2020 | Cochran ................ | B29C 49/78 |
| 2006/0118983 A1 | * | 6/2006 | Cochran ................ | B29C 49/68 264/492 |
| 2010/0089906 A1 | * | 4/2010 | Plantamura .......... | B29B 13/023 219/645 |
| 2011/0135288 A1 | * | 6/2011 | Winzinger ............ | B29B 13/024 392/416 |
| 2012/0269918 A1 | * | 10/2012 | Winzinger ............ | B29B 13/024 425/174.4 |
| 2013/0011807 A1 | * | 1/2013 | Winzinger ............ | B29C 49/786 392/428 |
| 2014/0166642 A1 | | 6/2014 | Kursawe et al. | |
| 2017/0173846 A1 | * | 6/2017 | Chen .................... | B29C 49/6418 |
| 2020/0397932 A1 | * | 12/2020 | Milesi ................... | B67C 7/0073 |
| 2021/0023763 A1 | * | 1/2021 | Milesi ................... | B29C 49/68 |

FOREIGN PATENT DOCUMENTS

DE      102006015853 A1    10/2007

OTHER PUBLICATIONS

Italian Search Report for IT Patent Application No. 202000001360, dated Sep. 28, 2020, 6 pages.

* cited by examiner

*Primary Examiner* — Robert B Davis
(74) *Attorney, Agent, or Firm* — Cantor Colburn LLP

(57) ABSTRACT

Described herein is a preform heating device, in particular a heating device which uses monochromatic infrared radiation preferably generated by lasers.
In particular, a heating device for preforms is configured so as to be positioned outside a preform and radiate an electromagnetic radiation in the infrared range, forming a radiation disk in such a device according to a radial symmetry with respect to the center of the preform axis.

17 Claims, 14 Drawing Sheets

PREFORM HEATING DEVICE

CROSS-REFERENCE TO RELATED APPLICATIONS

This application claims the benefit of priority to Italian Patent Application No. 102020000001360, filed on Jan. 24, 2020, the entire contents and disclosure of which are hereby incorporated by reference herein.

FIELD OF THE INVENTION

The present invention relates to a preform heating device, in particular a heating device which uses monochromatic infrared radiation preferably generated by lasers.

BACKGROUND ART

In a packaging line of beverages in plastic bottles, the first step consists in heating the preforms from which the bottle will then be blown, up to the softening point thereof.

This operation is normally carried out in special ovens in which the preforms are passed in a row at a reduced pitch and in which infrared radiation emitting lamps are arranged which heat up to the desired temperature.

The preforms are led along the heating path by means of spindles which, due to the action of suitable cams, are introduced inside the preform. At the end of the path in the oven, the spindles are disengaged from the preforms, by virtue of lifting cams, and the preforms are transferred to a movement system (typically distribution stars) which feeds them to the blowing machine.

These ovens are of considerable size since the path of the preforms must be long enough to allow the necessary heating times. In fact, the heat is diffused by the lamps along the path of the preforms, whereby, despite the provision of adequate reflective surfaces, the dispersion of heat into the environment is considerable.

The infrared lamps are typically tungsten lamps which have a maximum emission efficiency at 3000° K. However, considering that the various plastic materials have energy absorption spectra in rather narrow wavelength ranges, while tungsten lamps operated at maximum efficiency emit energy at very different wavelengths, only a small part of the energy is actually absorbed by the preforms, the remainder being dispersed in the environment. For example, if PET preforms are considered, which represent about 95% of the global market, the power used for heating in these conditions compared to the power actually stored by the preform has values indicating low efficiency, no more than 15% of the electrical energy introduced being effectively converted into thermal energy absorbed by the preforms.

The dispersion of unusable thermal energy from the preforms also requires an efficient refrigeration system to avoid the system overheating, which leads to further energy waste.

There is therefore the need to provide a preform heating system which has greater energy efficiency and which, possibly, has smaller dimensions than the ovens currently on the market.

Furthermore, the preform is currently heated by means of a grid of lamps which develop radiation from an overall flat surface and which therefore does not allow homogeneous radiation of the cylindrical container.

SUMMARY OF THE INVENTION

The problem underlying the present invention is thus to provide a preform heating device which solves the aforesaid drawbacks inherent in the known technology and which allows to obtain energy savings while optimizing the preform heating.

In particular, the present invention proposes radiation concentrated on the single preform, so as to avoid radiation dispersed in the environment.

The present invention also uses a monochromatic source of convenient wavelength, chosen from among those which have an absorption coefficient for PET, or other commonly used plastic materials, such as polyester resins, such as, but not limited to, PET (polyethylene terephthalate), PEF (polyethylene 2,5-furandicarboxylate, also defined as polyethylene furanoate, or polyethylene furfural), PLA (polylactic acid or polylactic resin), PEN (polyethylene naphthalate) and polyolefin resins such as PE (polyethylene), PP (polypropylene) also with the addition of copolymers, suitable for a convenient heating of the material. Such monochromatic radiation is available based on currently known technologies.

The heating system of the present invention follows the cylindrical geometry of the object to be heated, i.e., the preform, so as to radiate the preform according to a cylindrical geometry from the outside and to concentrate the radiation towards the inside of the preform.

The object of the present invention is thus a preform heating device as set out in the appended claims, the definitions of which form an integral part of the present description.

A first object of the invention is in particular a preform heating device comprising a heating element configured so as to be arranged outside the preform and to radiate an electromagnetic radiation in the infrared range forming, in such a device, a radiation disk according to a radial symmetry with respect to the center of the preform axis.

A second object of the invention is a heating device comprising a heating element configured so as to individually heat a preform from the outside, in which said heating element is powered by a laser device.

A further object of the invention is a diffuser of infrared radiation which runs through the inside of the preform diffusing the radiation according to a defined radiant geometry and intensity to optimize the incidence of the radiation itself.

A yet further object of the invention is a heating device comprising a heating element configured so as to illuminate a preform individually from the outside and to distribute the radiation emitted by a laser source on an optical path aimed at concentrating such radiation towards the central axis of the preform.

Further features and advantages of the present invention will be apparent from the description of some examples of embodiment, given here by way of non-limiting example.

DETAILED DESCRIPTION OF THE INVENTION

Figure 1:
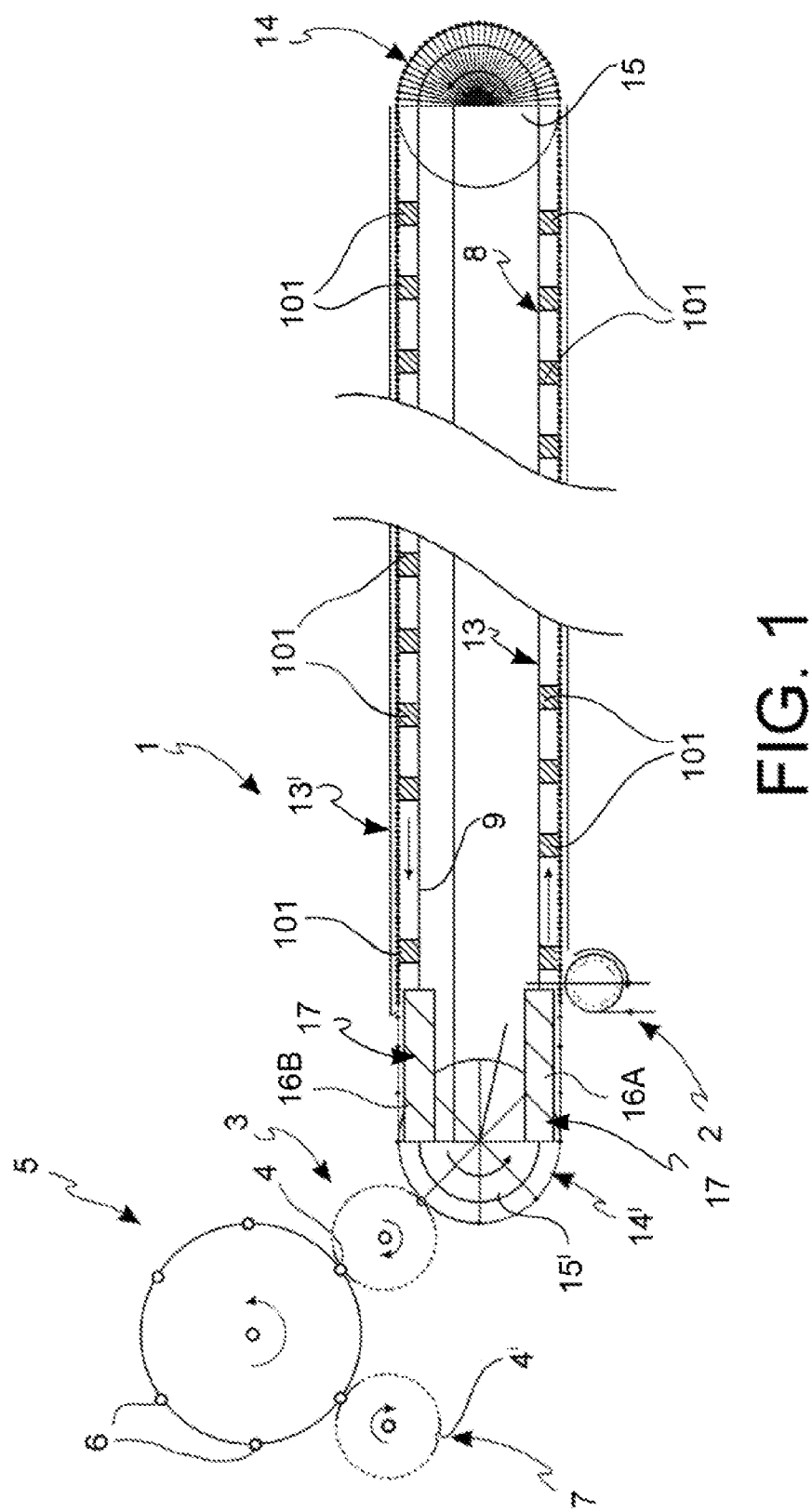
FIG. 1 shows a diagrammatic plan view from above of a preform oven comprising the heating device of the invention.

With reference to FIG. 1, the reference numeral 1 indicates an oven for the preforms according to the invention, coupled with a blowing machine 2.

The oven 1 is operatively connected to movement means 2, 3 for the preforms, respectively, at the inlet and at the outlet of the oven 1. Such movement means 2, 3 typically consist of distribution stars comprising a series of gripping means 4, for example notches or hollows, adapted to engage the preforms, for example at the neck.

The movement means 3 for the preforms at the outlet of the oven 1 are in turn operatively connected to a blowing machine 5 (the term "blowing machine" used in the present description means any type of blowing or stretch-blowing machine) comprising a plurality of molds 6 into which the heated preform is inserted and from which it exits in the form of a blown (or stretch-blown) bottle.

The blowing machine 5 is in turn operatively connected with distribution means 7, typically a distribution star, adapted to pick up the blown bottles at the output of the blowing machine and transfer them, by means of a suitable transport system, to the subsequent operating unit. For this purpose, the distribution star 7 comprises a plurality of notches 4' adapted to engage the neck of the blown bottles.

A path of the preforms is thus defined, indicated in FIG. 1 by the directions of the arrows, from the feeding thereof to the oven 1 to the entry thereof into the molds 6 of the blowing machine 5.

The oven 1 comprises transport means 8, adapted to move the preforms along a path and a plurality of heating devices 101 associated therewith, so that a heating device 101 corresponds to each preform.

The transport means 8 comprise a track 9 on which the plurality of heating devices 101 slides, each adapted to engage a preform. The track 9 comprises two substantially parallel straight stretches 13, 13' and two curvilinear stretches 14, 14' connecting the straight stretches 13, 13' at the two ends according to a circular arc path. Respective driving wheels 15, 15' are placed at said curvilinear stretches 14, 14'.

The heating devices 101 can transit along the track 10 passively, i.e., in contact with each other and each pushed by the device upstream as occurs in traditional preform ovens, or actively, i.e., be arranged on a rack, a chain or a motorized belt.

If the heating devices 101 are moved passively, the transport means 8 of the oven 1 further comprise means for moving and spacing the heating devices 101. Such movement means comprise a first auger 16A arranged at the feed point of the preforms in the oven, between the driving wheel 15' and a first straight stretch 13 of the track 9; and a second screw 16B arranged at the junction point between the second straight stretch 13' of the track 9 and the driving wheel 15'.

Both augers 16A, 16B comprise a spiral groove 17 with variable pitch intended to interfere with a suitable thrust wheel of each heating device 101. The augers 16A, 16B are mounted in an inverted position along the travel direction of the heating devices 101, so that the first auger 16A has the largest pitch upstream along the travel direction, while the second auger 16B has the largest pitch downstream.

The augers 16A, 16B can be moved independently but in a synchronized manner by respective motorizations (not shown), or by a single motorization provided with mechanical transmission.

The heating device 101 is configured so as to individually heat a preform P by radially sending the electromagnetic radiation from the outside towards the inside of the preform.

The heating device 101, configured to receive a preform P therein, comprises a vertically movable clamp 102 which can take a raised position of disengagement of the preform P and a lowered position in which the preform P is inserted into a respective heating bell 103. The clamp 102 is moved by an actuator 104 capable of following a predefined law of motion. The actuator 104 is powered and controlled by electric voltage lines coming from a manifold (not shown) composed of a first unit and a second unit for the distribution of power and control signals to the motors 104, respectively.

Figure 2:
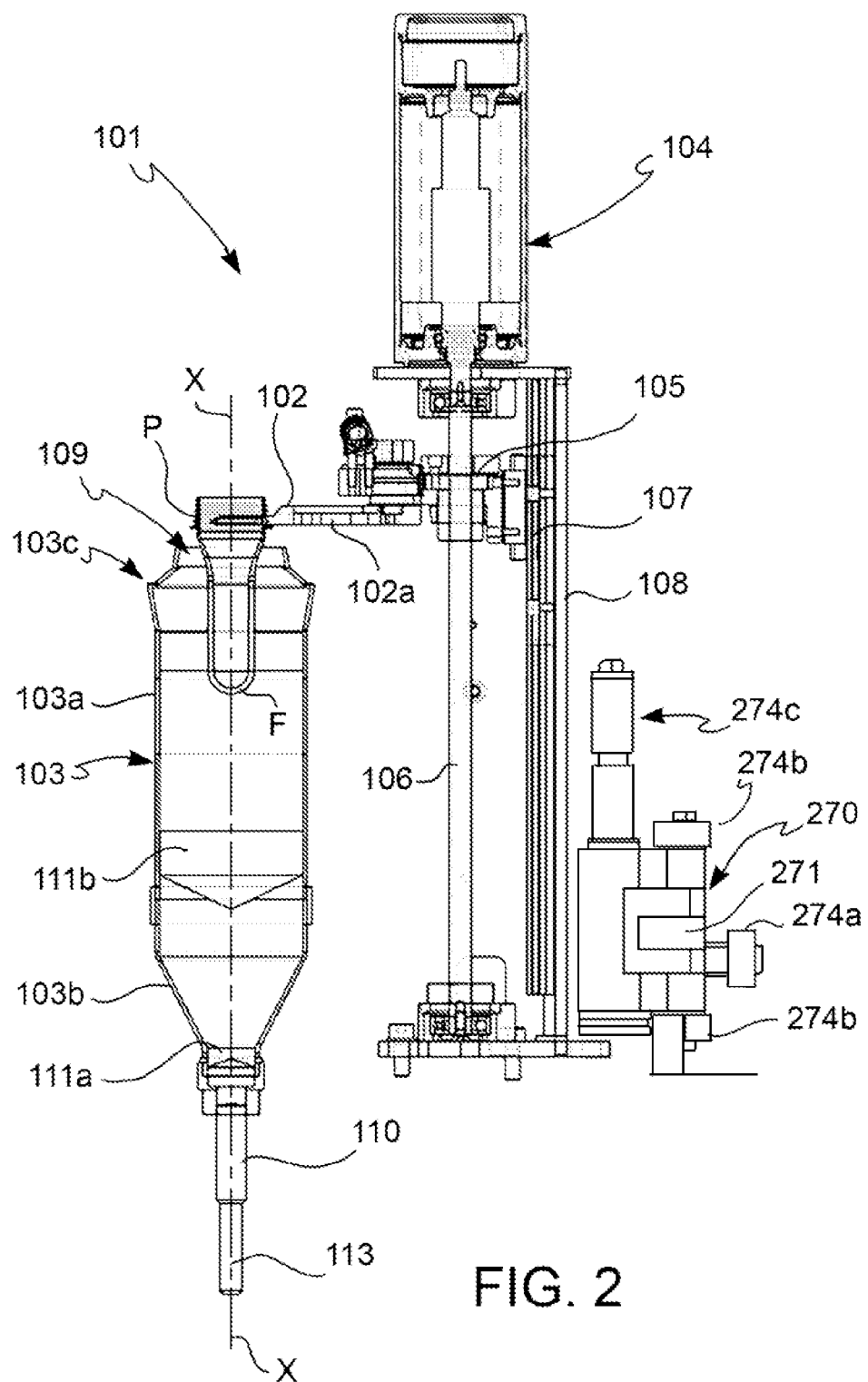
FIG. 2 shows a diagrammatic side view of a preform heating device according to the invention.

The clamp 102 is composed of two jaws 102a, 102b (in FIG. 2 only one jaw 102a is seen) capable of gripping the preform P in the cylindrical area located just above the finishing ring, either through the action of a spring or through the action of a special closing cam for gripping the preform from the star 2 and opening cam for releasing onto the star 3.

The vertical movement of the clamp 102 is operated by the dedicated actuator 104 (FIG. 2), preferably a stepper motor, servomotor, linear motor or brushless motor. It is thereby possible to operate a specific law of motion to optimize the heating inside the preform P.

The clamp 102 is supported by a support 105 which is driven by a screw 106 and is guided by low-friction seats 107. In the case of a linear motor, the screw 106 is not present. The assembly consisting of the movable clamp 102, the actuator 104, the screw 106 and the low-friction seats 107 is mounted on a support structure 108.

Figure 10:
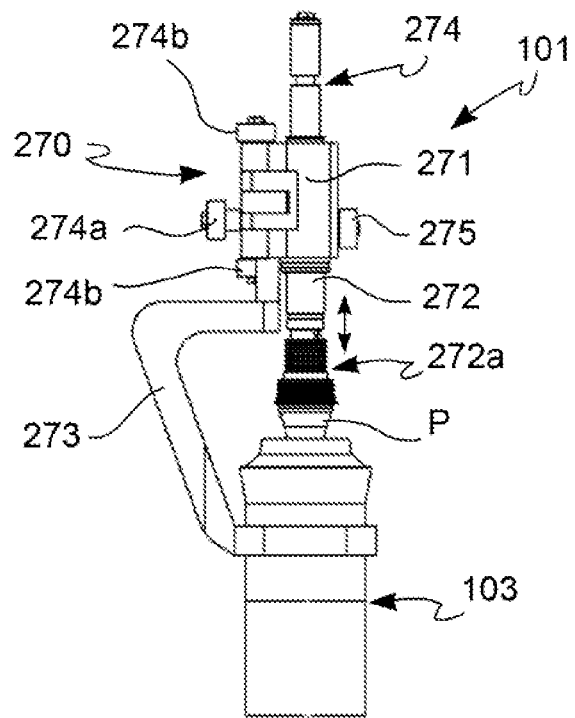
FIG. 10 shows a side view of a different embodiment of the heating device of the invention.
Figure 11:
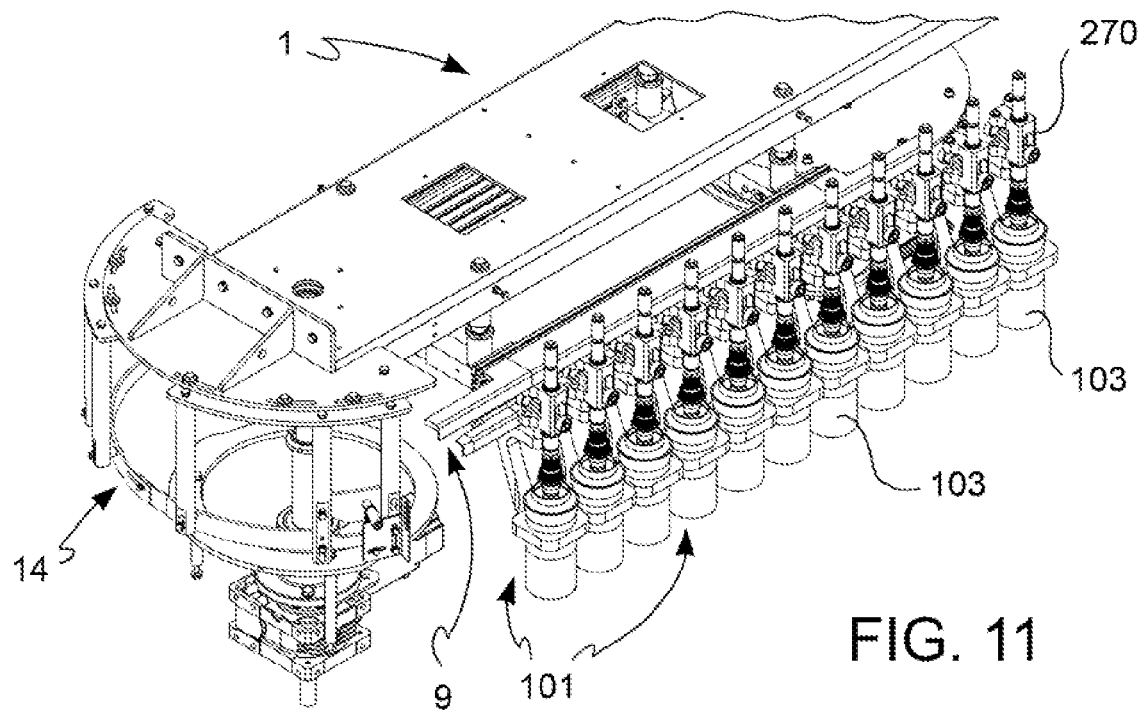
FIG. 11 shows a perspective view of a detail of a preform oven comprising the heating device of FIG. 10.
Figure 12:
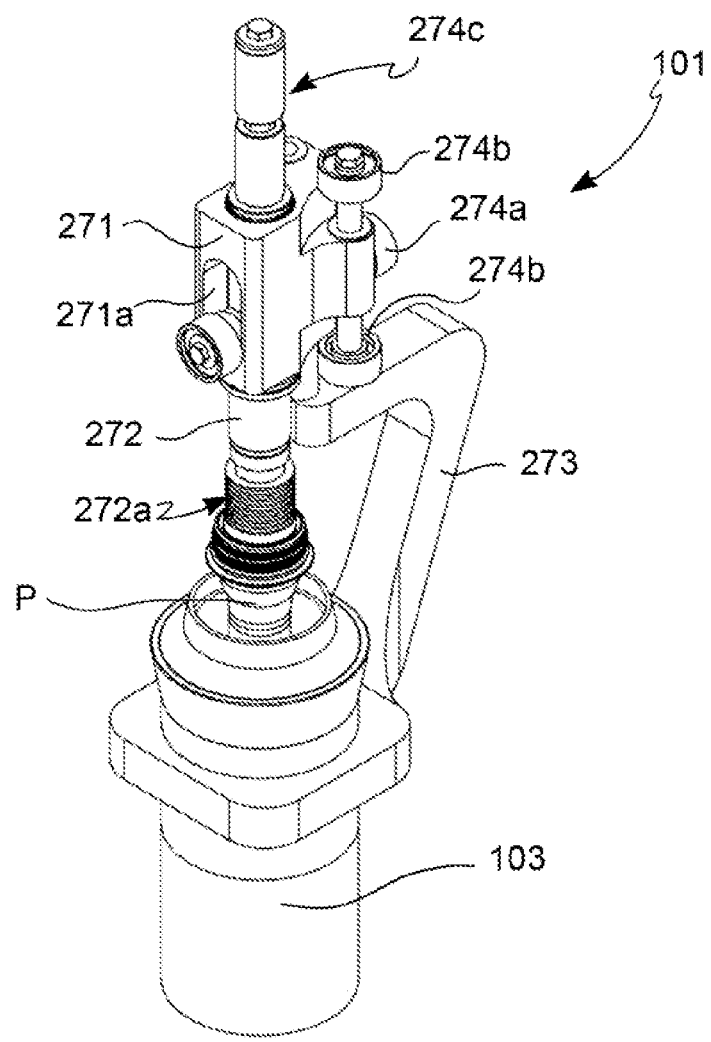
FIG. 12 shows a perspective view of the heating device of FIG. 10.
Figure 13:
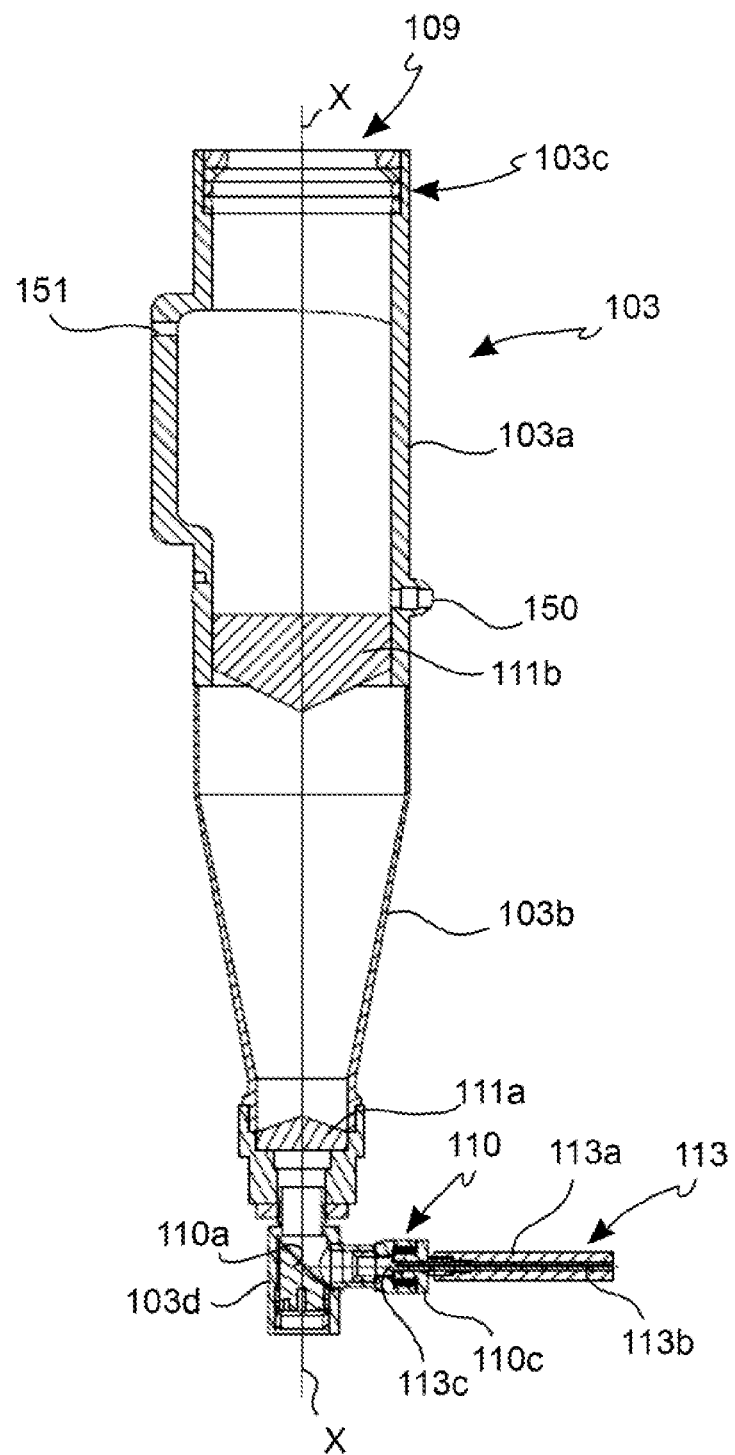
FIG. 13 shows a diagrammatic side view of a preform heating device in a different variant.

As an alternative to the solution with the clamp, it is possible to make the preform perform the same movements by grasping it with a spindle, a cylindrical body, which penetrates inside the threaded part of the preform, not subject to heating, or by gripping the preform from the outside. The interference required to manipulate the preform is obtained by elastic elements placed in the spindle device. An example of such an embodiment is shown in FIGS. 10, 11 and 12.

With reference to such figures, the heating device 101 comprises a sliding member 270 comprising a body 271 in which a spindle 272 is slidably inserted, movable along a vertical direction between a raised position and a lowered position. The spindle 272 is configured to engage with the neck of a preform P by means of conventional engagement means 272*a*.

The sliding member 270 is connected to a heating bell 103 by means of a connecting element 273, so that the heating bell 103 is positioned below in alignment with the spindle 272.

The sliding member 270 comprises driving wheels 274*a*, 274*b*, 274*c* for sliding and aligning the sliding member 270 on the track 9, in the same manner as the spindles in conventional ovens.

On the body 271 of the sliding member 270 there is also a wheel 275, connected to the spindle 272 and movable in a slot 271*a* of the body 271 (FIG. 12), configured to interact as a driven member with a cam (not shown) for the commanded lowering/raising of the spindle 272. It is thereby possible to insert the preform inside the heating bell 103 for the time and with the desired speed profile, obtainable by suitably configuring the cam.

In the embodiment of FIGS. 2-8, the support structure 108 in turn comprises a sliding member 270 along the track 9 of the oven 1 (seen in FIG. 2), comprising driving wheels 274*a*, 274*b*, 274*c* as described above.

The heating bell 103 is also fixed to the support structure 108 by means of a suitable connecting rod (not seen in the drawings), so as to move integrally therewith.

The heating bell 103 (FIGS. 2, 3, 4 and 13) comprises a substantially cylindrical hollow body 103*a*, a conical portion 103*b* placed at one end of the body 103*a* and a reflective portion 103*c* placed at the opposite end of the body 103*a*.

The heating bell 103 has an opening 109, coaxial to the axis X-X of the bell, at the reflective portion 103*c*, while it comprises a collimator member 110 at the end of the conical portion 103*b*.

Downstream of the optical path of the collimator member 110, the conical portion 103*b* of the heating bell 103 comprises a first lens or axicon 111*a*, located at the end of said conical portion 103*b* connected to the collimator member 110. A second lens or axicon 111*b* is placed in the lower section of the cylindrical body 103*a*.

The lenses and axicons used are made of a material with an adequate refractive index in the radiation used so as to develop a suitable geometry of the exiting radiation beam, in the form of a cylinder. The suitable materials are, for example, but without limitation to those listed below: quartz, silica, magnesium fluoride, calcium fluoride, silicon, germanium or rare earth corundum or boron glass. The surfaces of these optical devices have a treatment necessary to reduce reflection in the opposite direction to that of the radiation. Such optical devices are known to those skilled in the art and will not be described in detail.

In a different embodiment of the heating bell (FIG. 13), the body 103*a* comprises a shaped orifice 150, for blowing purified air to keep the surface of the axicon 111*b* clean. The air introduced at high pressure must be evacuated without touching the outer surface of the preform in order not to remove the absorbed heat. For this purpose, the body 103*a* comprises a second orifice 151, connected to an exhaust/intake system capable of evacuating a significant part of the purified air introduced. The body 103*a* has, between the second axicon 111*b* and the reflective portion 103*c*, an enlarged section which allows to better channel the turbulence of the blown air, minimizing the risk of the air touching the surface of the preform.

The reflective portion 103*c* comprises a series of frusto-conical surfaces in the internal part, coated with reflective material, as will be better described below. In the lower part, the radiation can be introduced either by an in-line collimator along the axis of the heating bell, as in FIG. 2, or, as in the embodiment of FIG. 13, with a collimator 110*a*, housed in a housing 103*d* connected to the frusto-conical portion 103*b* of the device 103. The collimator 110*a* deflects the radiation by 90° and possibly can allow the relative rotation between the fiber and the collimator, thanks to a rotating optical joint (as shown).

The reflective portion 103*c* comprises a system of frusto-conical reflective surfaces 112*a*, 112*b*, 112*c*, comprising, in sequence from the body 103*a* towards the opening 109, a first frusto-conical reflective surface 112*a* flared outwards, a second frusto-conical reflective surface 112*b* converging towards the central axis X-X of the bell 103 and a third frusto-conical reflective surface 112*c* converging towards the central axis X-X, in which the first, second and third frusto-conical reflective surfaces 112*a*, 112*b*, 112*c* are tilted by an angle α, by an angle β and by an angle γ, respectively, with respect to respective cylindrical surfaces coaxial to the axis X-X.

In particular, angle α is smaller than angle β and is greater than or equal to angle γ.

A substantially cylindrical absorbent surface 112*d*, obtained by coating the upper portion of the body 103*a* with highly absorbent substances in the infrared range, is placed between the body 103*a* and the first frusto-conical reflective surface 112*a*. An example is a carbon or "black oxide" coating after having deposited a layer of zinc/molybdenum on the metal with which the heating bell 103 is made, which allows the adhesion of highly absorbent and high temperature resistant substances (of the order of 200° C.). Another example can be a surface treatment which makes the surface 112*d* a "meta-surface", i.e., which is capable of trapping most of the radiation in the most superficial layer by virtue of the particular structure thereof produced through nanotechnologies.

Figure 16:
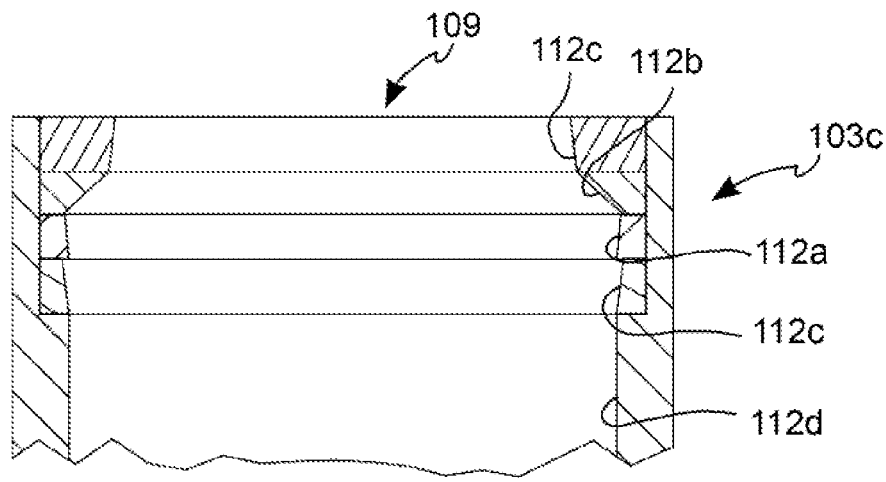
FIG. 16 shows a sectional side view of a detail of FIG. 13.
Figure 17:
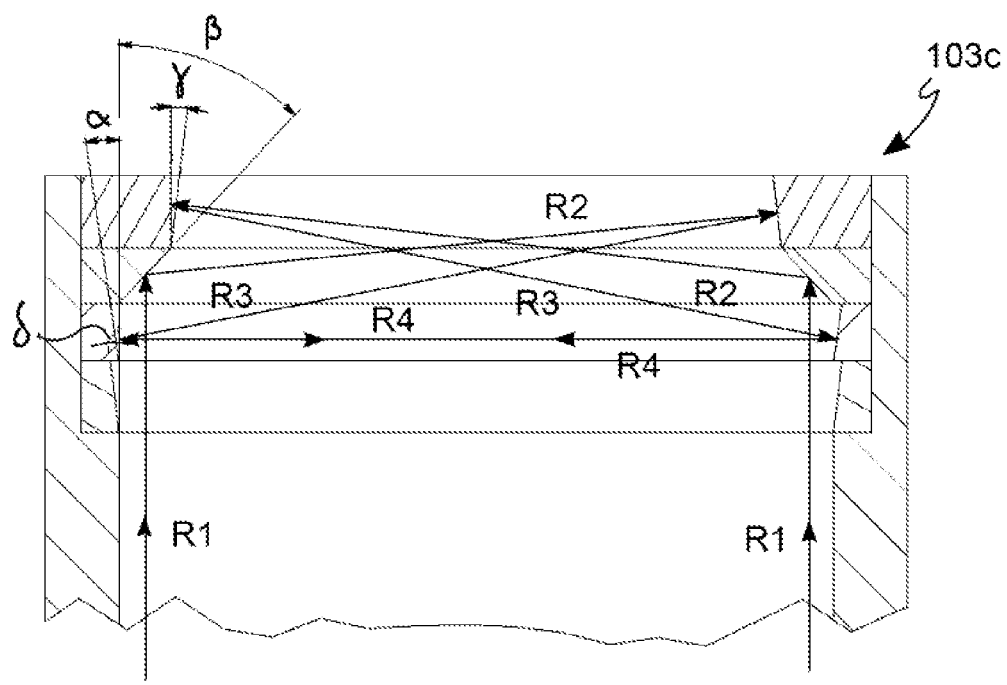
FIG. 17 shows a view of the detail of figure highlighting the sectional path of the heating radiation.

In particular, FIGS. 16 and 17 show a version of the reflective portion 103*c* provided with four reflective surfaces 112*a*, 112*b*, 112*c*, 112*e* and an absorbent vertical surface 112*d*. This solution allows a greater absorption of the heating radiation and a more uniform radiation in the thickness of the preform. The cylindrical surface 112*d* is highly absorbent as already described. In this alternative there are four frusto-conical surfaces tilted according to angles α, β, γ and δ. In particular, angle α is smaller than angle β and is greater than or equal to angle γ. Angle δ is smaller than angle α. FIG. 17 shows by way of example the optical path of the radiation arriving parallel from the collimator member 110.

Figure 3:
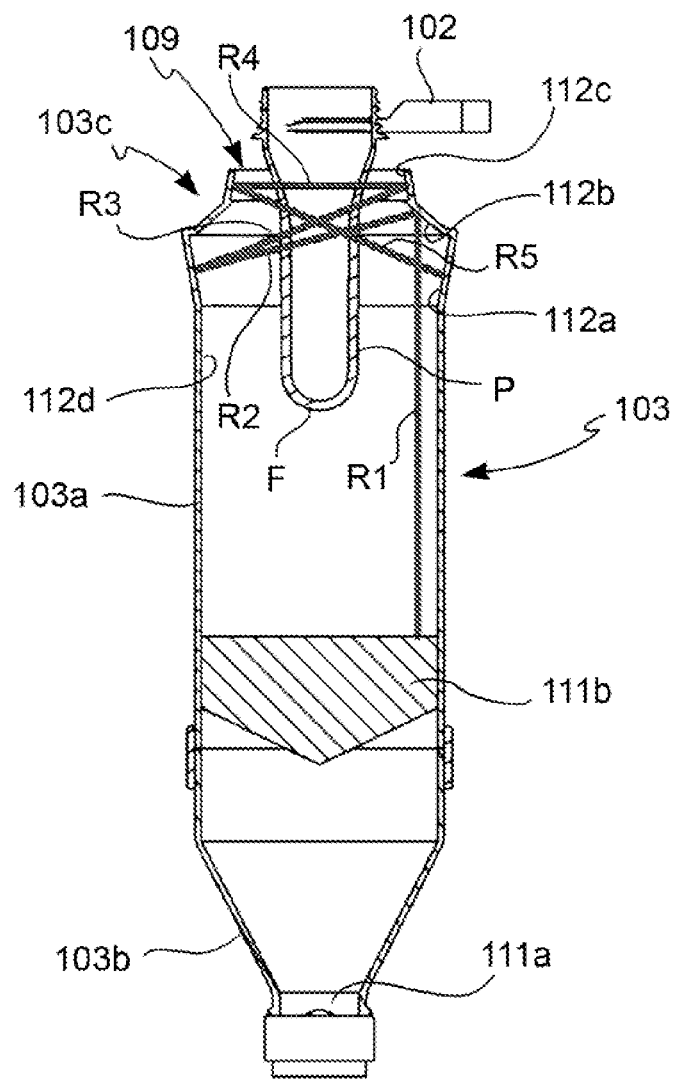
FIG. 3 shows a sectional side view of the heating bell of the embodiment in FIG. 2 with the expected path of the radiation rays indicated.
Figure 4:
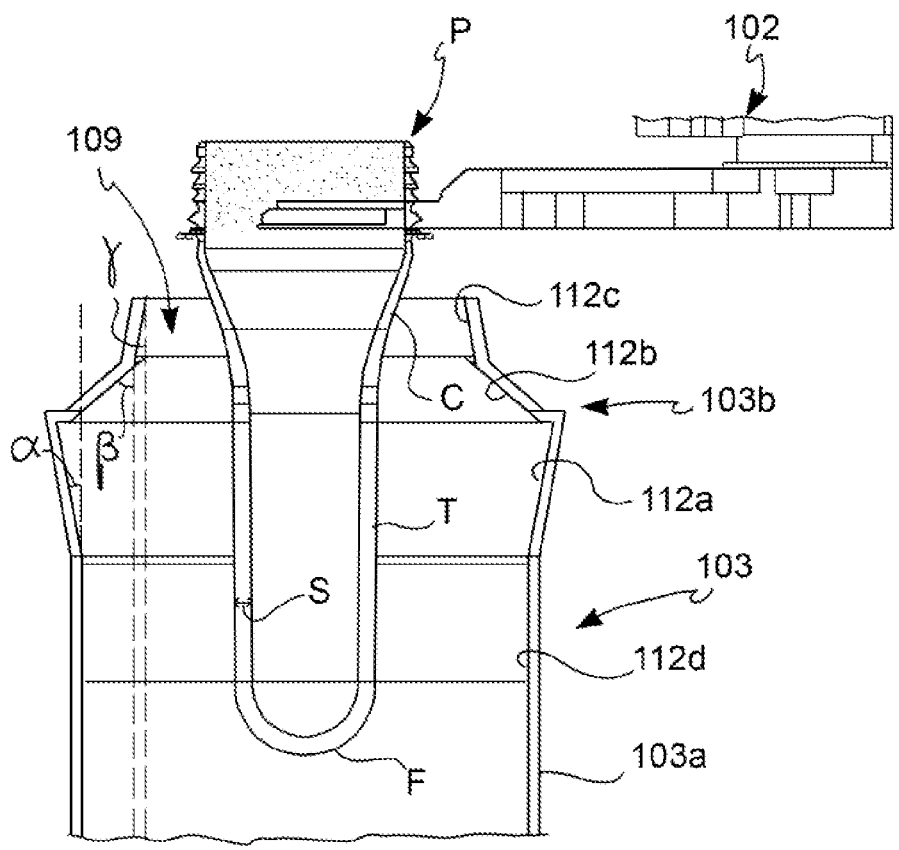
FIG. 4 shows a sectional side view of a detail of FIG. 3.
Figure 5:
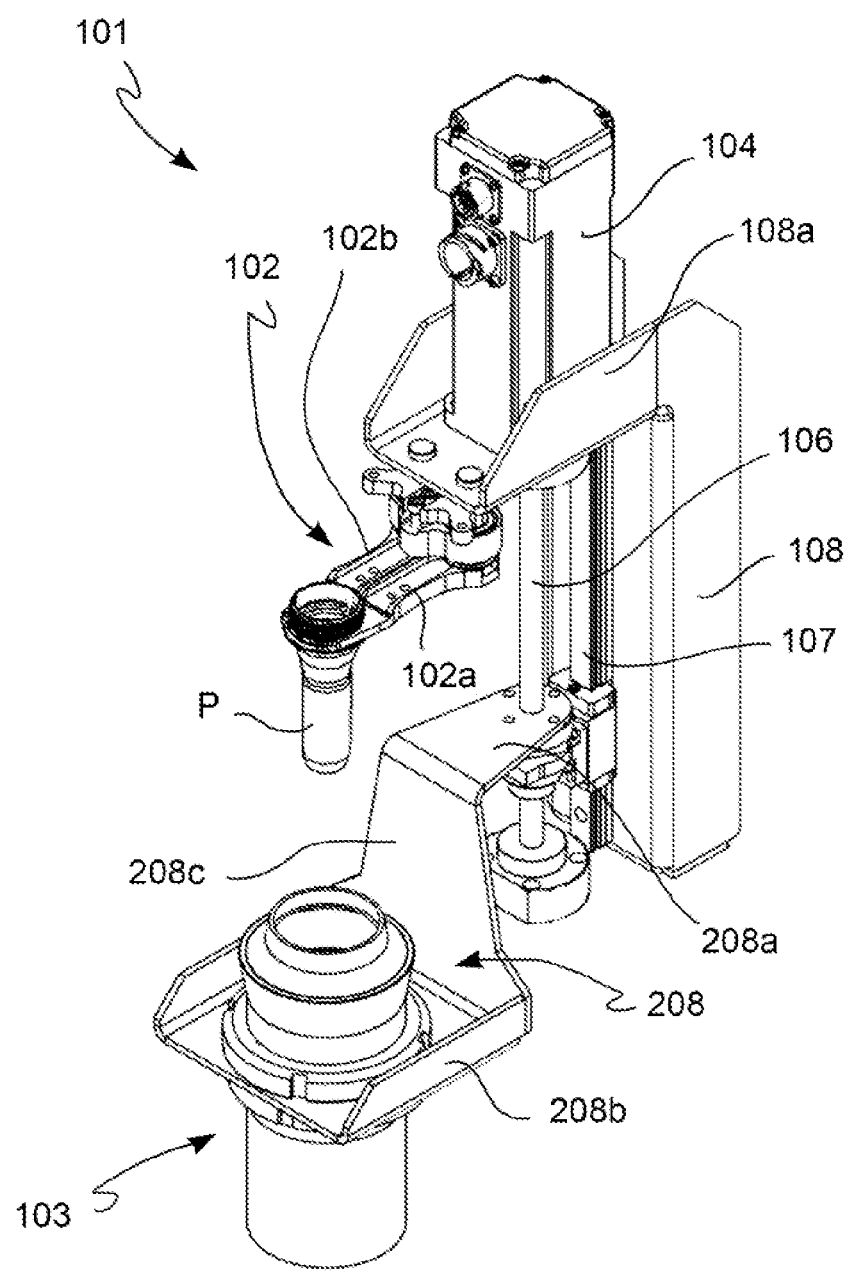
FIG. 5 shows a perspective view of a second embodiment of the heating device of the invention.

The collimator member 110 is fed by an optical fiber 113 which generates a collimated beam of infrared radiation, which is refracted by the two lenses or axicons 111*a*, 111*b* arranged in series, so as to generate a radiation cylinder R1 with the appropriate degree of homogeneity (FIG. 3). Alternatively, instead of refractive devices, such as axicons and lenses, it is possible to use diffractive optical elements, such as grids or nanostructures which utilize the phenomenon of diffraction and constructive and destructive interference.

Figure 14:
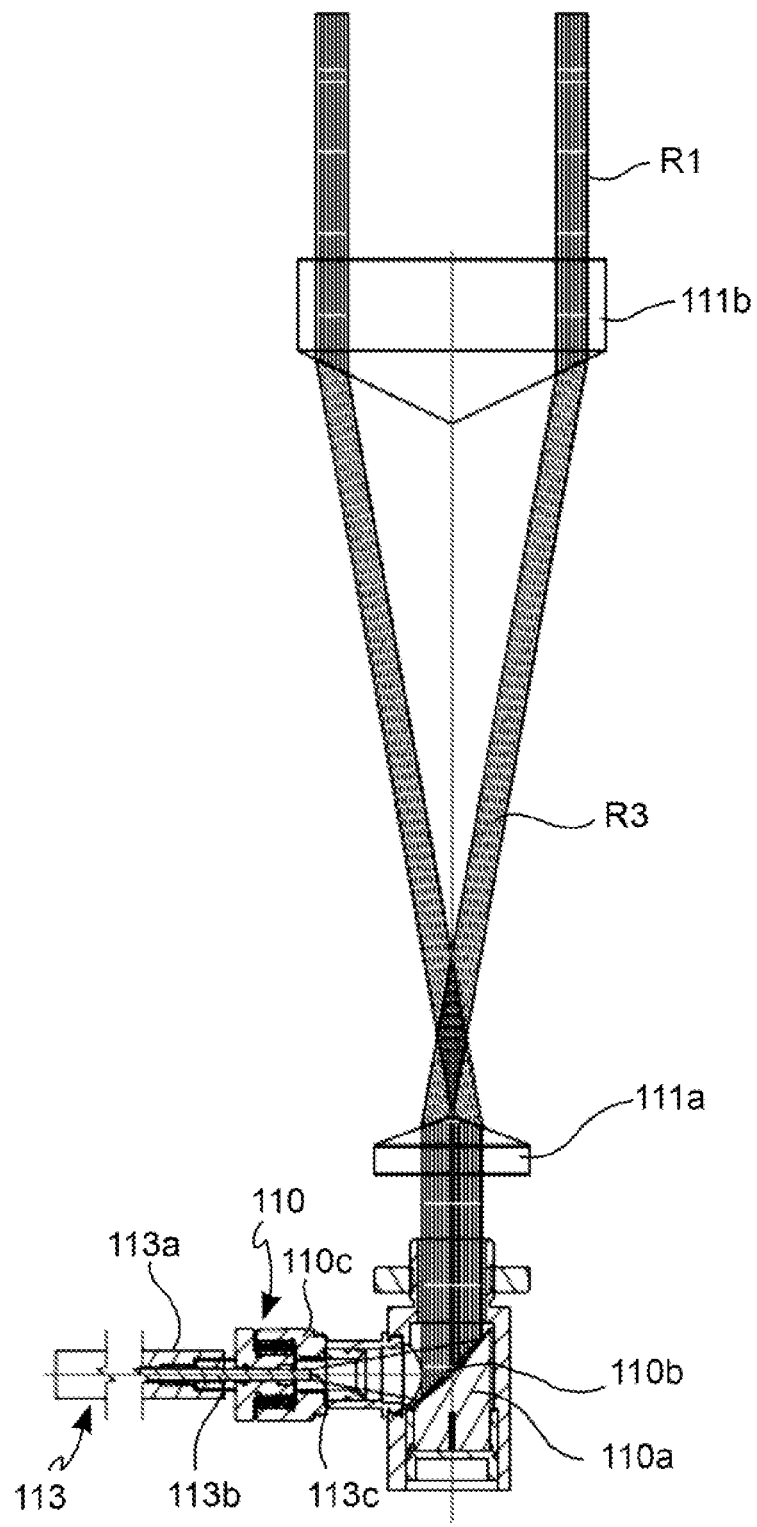
FIG. 14 shows the optical diagram for the conformation of the heating radiation according to the variant of FIG. 13.
Figure 15:
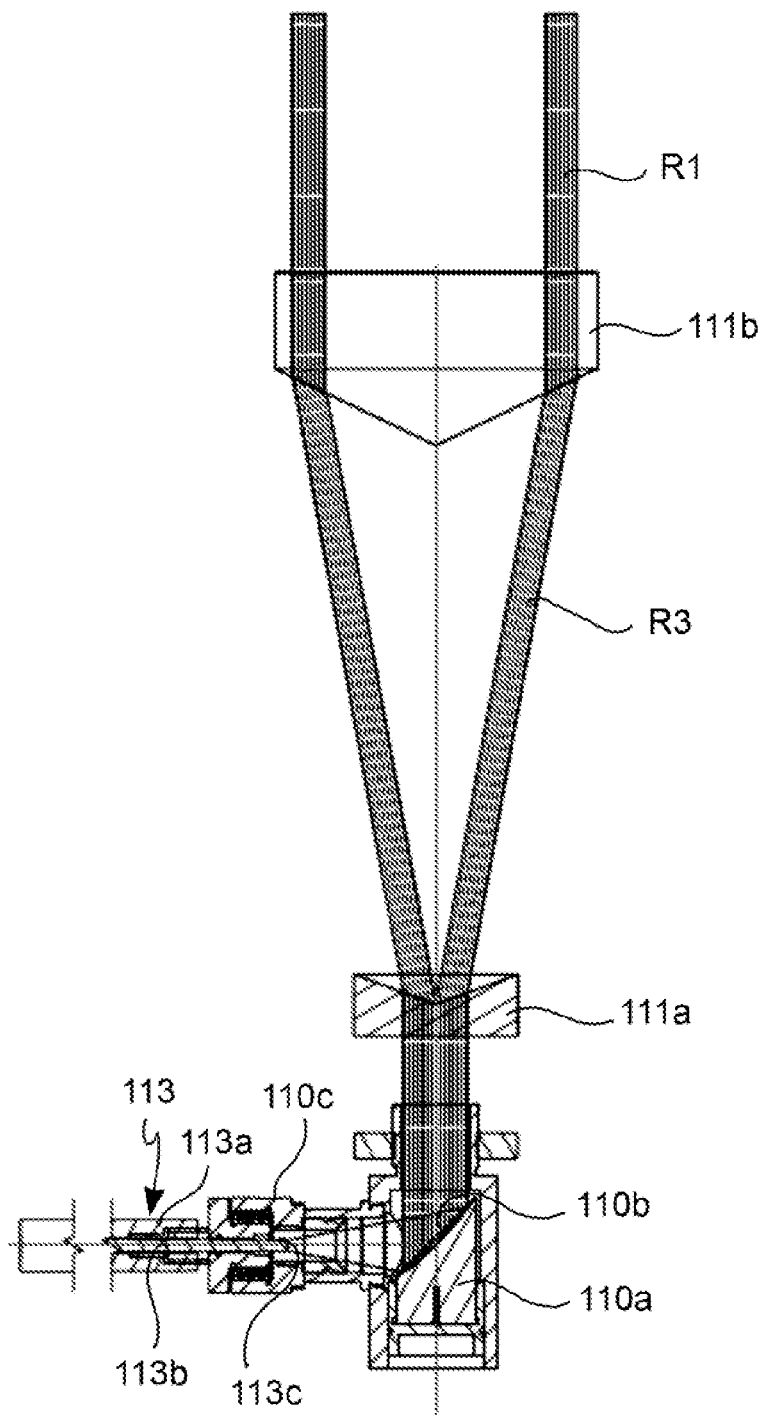
FIG. 15 shows an alternative optical diagram for the conformation of the heating radiation according to the variant of FIG. 13.

FIGS. 14 and 15 show the paths of the heating radiation beams seen in section with cylindrical and conical symmetry. In these diagrams the collimator member 110 comprises a collimator 110*a* at a 90° angle for a more compact solution.

In detail, in FIG. 14 the device comprises a pair of axicons 111a, 111b, both positive, i.e., with the tilted part everted, while in FIG. 15 the axicon 111a has a negative conicity. This latter solution requires an unusual axicon, but has the advantages of a more compact solution and a lower radiation intensity on the central axis.

The optical fiber 113 is shown in section and comprises the sheath 113a with the actual optical fiber 113b inside made up of two dielectric materials, one inside the other, called cladding and core. At the end 113c of the fiber 113 the radiation spreads according to a conical symmetry possibly guided by a spherical lens placed on the end part of the fiber. Otherwise, the radiation beam exiting the fiber can be collimated towards the axicon 111a by a more common system of circular lenses, as known to those skilled in the art. In the case of an angled collimator 110a, the radiation cone emerging from the fiber impacts on a highly reflective surface 110b, with a parabolic profile, which being inclined on average at 45° reflects the radiation beam in a vertical direction. In a variant of the invention, the fiber 113 can be integral with a rotatable element 110c, connected to the housing 103d of the collimator 110a by means of a bearing or bushing joint. Thereby, in certain embodiments of the machine which use this type of illuminator, it is possible to allow a rotation of the fiber without generating twisting loads on the fiber or the structure. The radiation beam proceeds upwards either through the positive axicon 111a or through the negative axicon 111b. In both cases, as shown in FIGS. 14 and 15, the radiation expands according to a hollow cone as seen in section and subsequently, crossing the axicon 111b, it moves as a hollow cylinder towards the reflective surfaces 103c.

A further alternative is to provide, instead of a negative axicon 111a, an optical diffraction device which simulates the effect of the negative axicon, i.e., it can generate a radiation cone using the phenomenon of diffraction and constructive and destructive interference, as known in the field of optical devices. A further alternative solution to obtain the radiation cone R3 is the use of a biaxial crystal with internal conical refraction. Crystals of this type for industrial use are tungsten, potassium and gadolinium oxides, in particular the potassium and gadolinium di-tungstenate crystal, $RGd(WO_4)_2$, commercially defined as "MDT crystals" (Monoclinic Double Tungstate). Collimating the radiation on the lower surface of the crystal, oriented along a particular optical axis of the crystal itself, downstream of the upper surface, a radiation cone similar to that obtained with the negative axicon is obtained.

As detailed in FIG. 3, the radiation cylinder R1 illuminates the second frusto-conical reflective surface 112b of the reflection portion 103c and is reflected on the first frusto-conical reflective surface 112a (ray R2), then on the third frusto-conical reflective surface 112c (ray R3) and then again along the rays R4 and R5. In the embodiment of FIGS. 16 and 17 with four reflective surfaces, the path of the heating radiation, again according to a cylindrical symmetry, starts from the ray R1 which illuminates the surface 112b, then the surface 112c, then the surface 112a and in this situation the radiation is confined to always reflect on the surface 112a, the fourth additional surface 112e is needed to confine the reflected and refracted radiation from the surface and thickness of the preform. The convenient radiation in the form of a radiation ring required for a heating operation according to the desired degree is obtained through various reflections between said frusto-conical reflective surfaces 112a, 112b, 112c (and, when present, on the surface 112e), and refractions in the thickness of the plastic material. This series of external and internal reflections leads to the appropriate absorption of radiation and, hence, to optimal heating of the material with much higher accuracy than current lamp heating systems. The temperature distribution and the related gradients (by virtue of the phenomenon of heat deposition directly inside the material obtained by the correct selection of the radiation) allow the system according to the invention to offer a much higher heating quality than that available now. Finally, the band with highly absorbent treatment 112d placed on the metal cylinder absorbs any residual radiation which may escape from the light ring generated between the surfaces 112a, 112b, 112c, 112e to confine the heat generation to the upper part in this manner.

The reflective surfaces can be made of highly reflective coatings, for example, but not limited to gold, silver, or polished aluminum, and protected by a transparent layer, or may be made of dielectric multilayer material capable of increasing the reflectivity of the substrate. The outer structure of the heating bell 103, preferably made of metal material (for example aluminum), ensures proper heat dissipation, absorption of dispersed radiation, and appropriate robustness.

The system of frusto-conical reflective surfaces 112a, 112b, 112c, 112e and the relative tilting angles $\alpha$, $\beta$, $\gamma$ and $\delta$ are configured so as to trap most of the infrared radiation in the radiation ring shown in FIG. 3. Furthermore, the path of the radiation is designed to heat the preform in an appropriate and homogeneous manner through the thickness thereof and along the vertical direction. In addition, the so-called "heating radiation disk" has a reduced thickness in order to have more localized and accurate heating. Thereby, the heating of the radiated preform P portion is optimized and the radiation which may return to the optical fiber 113 and from there to the laser source, which would otherwise be damaged, is minimized. To make the system of the invention non-dependent on the particular geometry of the preform, the highly absorbent band 112d confines, as said, the radiation to the upper part of the heating bell.

The vertical movement of the preform P, as mentioned, follows a predefined law of motion, not only to radiate the entire preform P, excluding the neck above the finishing ring, but also to increase or decrease the radiation time as a function of the portion of preform to be treated and the specific heating requirements.

Furthermore, the laser source has its own modulability with a high degree of accuracy in addition to the variation in the sliding speed (law of motion) of the preform within the electromagnetic heating radiation circle.

The possibility of modulating both the intensity of the emitted radiation and the law of motion of the related preform-heating bell movement is a considerable advantage of the device of the invention. In fact, it is known that the conical portion of the preform placed immediately below the finishing element is typically subject to greater deformation and therefore could require greater heating, with respect to the other regions of the preform, to obtain a high plasticity. Another factor which can determine a greater or lesser duration of exposure of a region of the preform to the heating radiation is the variation in preform thickness.

In one embodiment, the law of motion will comprise the following steps:

a) introducing the bottom F of the preform P into the opening 109 of the heating bell 103;

b) related sliding of the tubular portion T of the preform P with respect to the heating bell 103 at a first speed v1;

c) related sliding of the conical portion C of the preform P with respect to the heating bell 103 at a second speed v2 lower than said first speed v1;

d) modulating the intensity of the infrared radiation as a function of said speeds v1, v2 and of the thickness S of the wall of the preform P, in which said first and second speeds v1, v2 are, for the same intensity of infrared radiation, inversely proportional to said thickness S.

The variation of the sliding speed of the preform is easily obtainable thanks to the drivers available on the market which drive the stepper motors or with permanent magnets or brushless motors as previously described. Then the operating computer/PLC of the machine stores a specific law of motion for each type of preform and type of container.

The embodiment described hereto involves the vertical movement of the preform P, while the heating bell 103 remains vertically fixed. Alternatively, it is possible to keep the preform P and the respective clamp 102 fixed and to vertically move the heating bell 103, supported by an arm 208, with a similar actuator system 104, movement screw 106 and guides 107, as described above and as seen in FIG. 5.

In one embodiment, the support structure has an inverted L shape and comprises a horizontal portion 108a on which the actuator 104 and the clamp 102 are fixed. The arm 208 in turn has a stepped shape and comprises a first end portion 208a, connected to the screw 106 for moving the heating bell 103, a second end portion 208b, which supports the heating bell 103, and a connection lift 208c.

In a different embodiment, shown in FIGS. 6 to 8, the preform P is moved overturned, i.e., with the neck arranged below. In this embodiment, the heating bell 103 is fixed, while the preform P is vertically movable, but in a different embodiment the preform could be fixed and the heating bell 103 could be movable, as described above.

Figure 6:
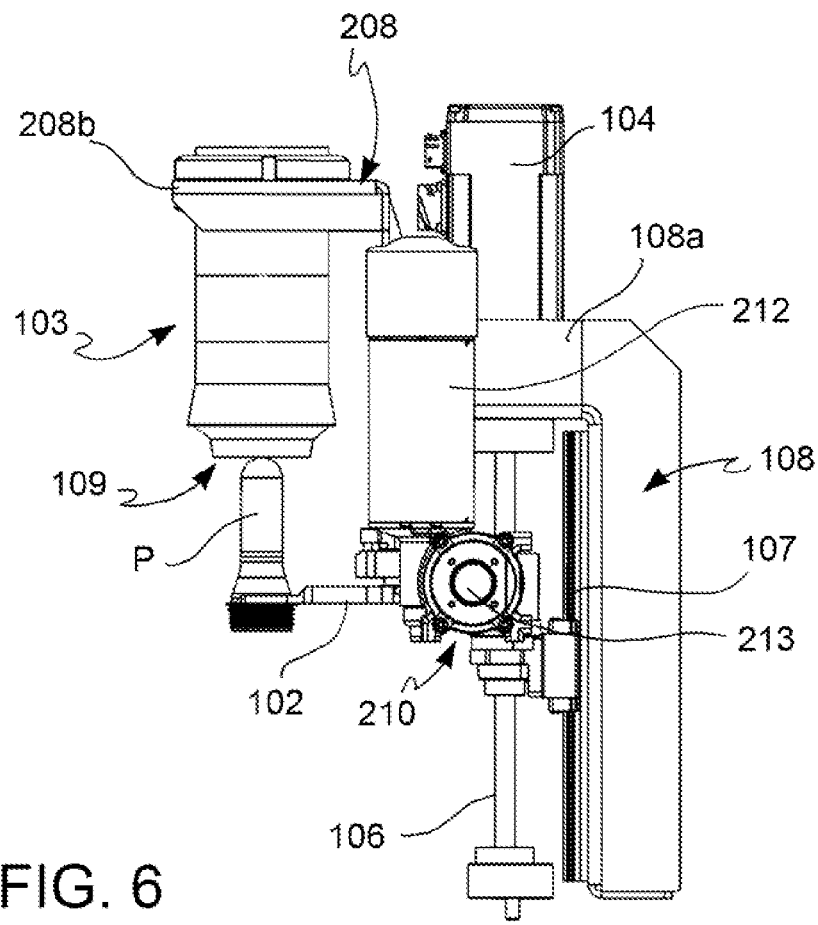
FIG. 6 shows a side view of a third embodiment of the heating device of the invention.
Figure 7:
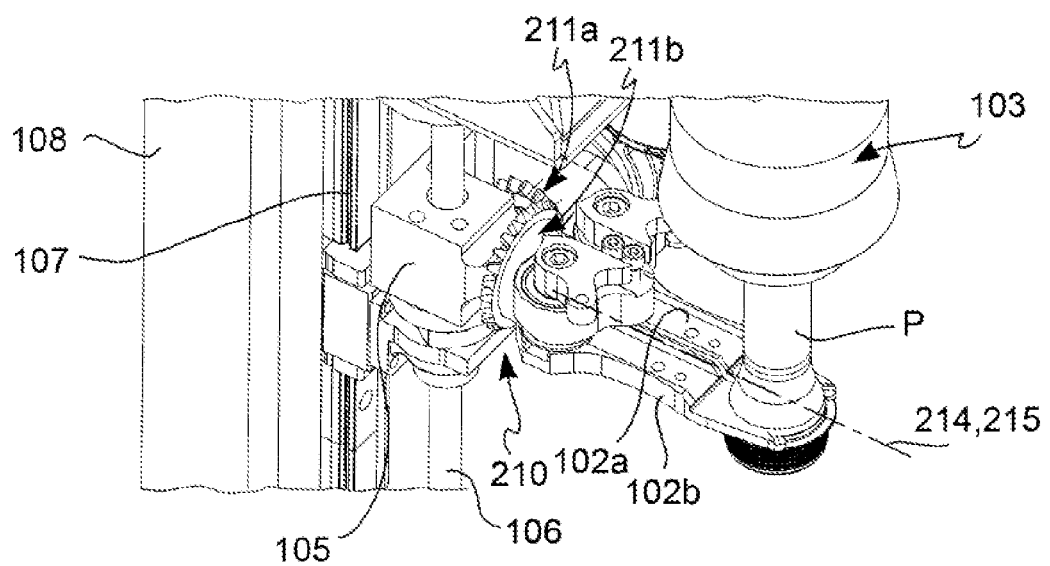
FIG. 7 shows a perspective view of a detail of the heating device of FIG. 6.
Figure 8:
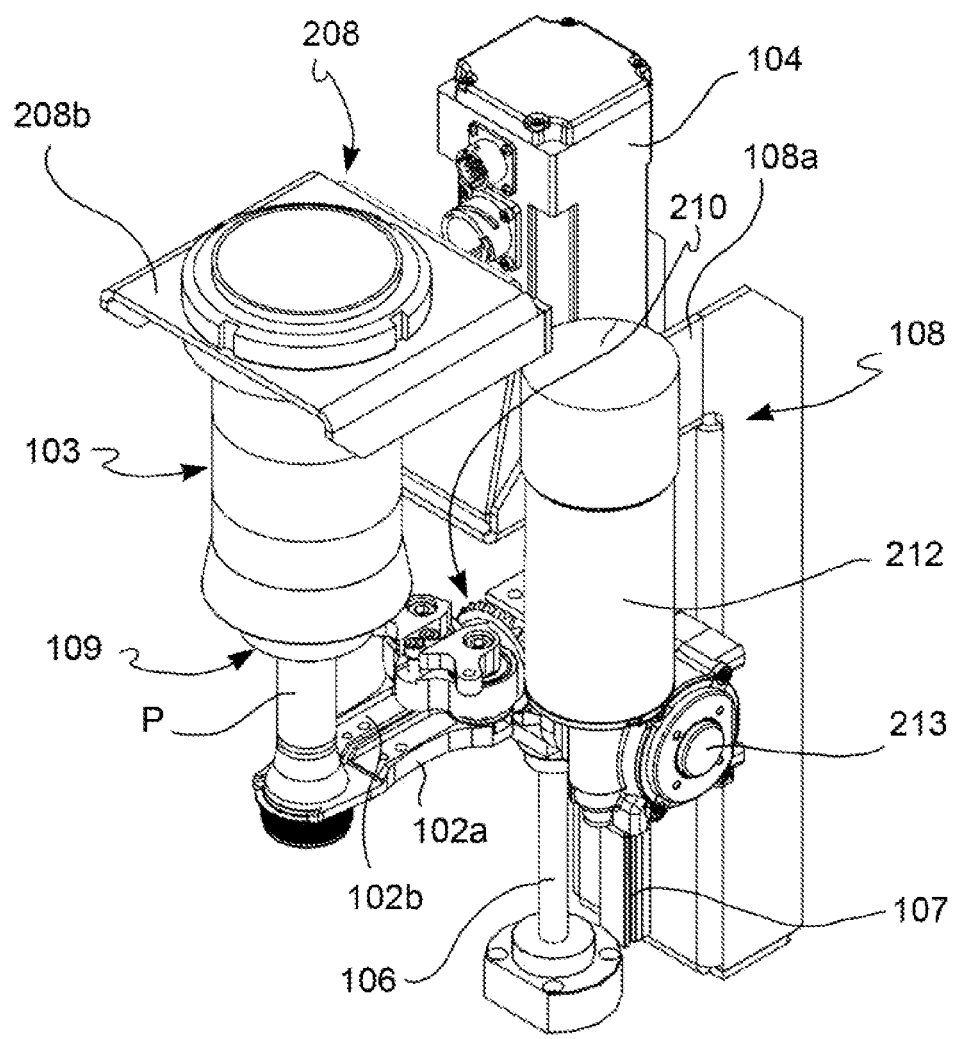
FIG. 8 shows a perspective view of the heating device of FIG. 6.

As shown in FIGS. 6-8, the support structure 108 has an inverted L shape and comprises a horizontal portion 108a on which the actuator 104 is fixed and an arm 208 comprising an end portion 208b supporting the heating bell 103, so that the opening 109 of the heating bell 103 faces downwards.

The clamp 102 is supported by a support 105 which is driven by a screw 106 and is guided by low-friction seats 107. The support 105 comprises an overturning member 210 of the preform P, adapted to bring the preform P from a normal condition, in which the preform has an upwards opening, to an overturned condition, in which the preform has a downwards opening, and vice versa.

The overturning member 210 comprises a first and a second conical gear wheel 211a, 211b, said conical gear wheels being meshed with each other and having axes 213, 214 respectively perpendicular, and an actuator 212.

The actuator 212 is operatively associated with the axis 213 coaxial to the first conical gear wheel 211a, while the axis 214 coaxial with the second conical gear wheel 211b coincides with the longitudinal axis 215 of the clamp 102. Thereby, the rotation of the actuator 212 causes the rotation of the first conical gear wheel 211a and consequently the rotation of the second conical gear wheel 211b along a perpendicular axis and therewith the clamp 102 from which the preform P is held. This mechanism is necessary if the movement means 2, 3 of the preforms at the inlet and at the outlet of the oven 1, respectively, are configured to move the preforms P in a normal condition, i.e., with the opening upwards. If, vice versa, such movement means 2, 3 are capable of moving the preforms in an overturned condition, the overturning member 210 would no longer be necessary.

The oven 1 can comprise an optical collector capable of transferring the radiation feeding each heating bell 103 from a fixed static laser source to the respective heating bell 103. The optical collector 364 can alternatively be placed in the upper part of the carousel 303 according to the overall dimensions. The optical collector transfers the radiation of the optical fibers coming from a laser source to the corresponding optical fibers 113, movable together with the heating devices 101, which feed the heating bells 101.

The optical collector can be connected to a plurality of laser sources. Alternatively, it is possible to provide an optical collector which receives the radiation from a single laser source and distributes it according to suitable proportions as a function of the time to the various heating bells 103, which are in different heating steps. In fact, the various preforms enter the oven 1 continuously and with a phase shift which makes it essential to modulate the infrared radiation for each preform P along the path thereof in the oven 1. This modulation of the intensity of the radiation sent to each heating bell can occur through the use of photonic crystals which act as switches and modulators of the radiation intensity passing therethrough by virtue of variable electromagnetic fields which are applied to such crystals. Thereby the radiation supplied by a single laser source, once distributed to the various heating units, can be activated and modulated in intensity by acting on the photonic crystal and obtaining the individual switching on, switching off and modulation for each preform P according to the heating step thereof and according to the specific area concerned.

A variant includes arranging a laser source for each heating bell 103, placing said laser sources directly on the heating devices 101, which allows to avoid the use of an optical collector.

In particularly preferred embodiments, the electromagnetic radiation emitted by the laser device is within the following wavelength ranges:

1620-2100 nm, preferably 1652-1674 nm and/or
1701-1880 nm and/or
1907-1919 nm and/or
1951-2000 nm, and/or
1803-1813 nm and/or
1903-1913 nm and/or
1941-1961 nm and/or 1972-2012 nm.

Even more preferably the electromagnetic radiation has a wavelength of 1661 nm and/or 1721 nm and/or 1908 nm and/or 1951 nm and/or 1992 nm, the wavelength of about 1940-1955 nm being the most preferred.

It is also possible to use the optical heating path to convey UV-C radiation from LED or laser devices to sterilize the preforms, as described in Italian patent application no. 102019000009591 filed on Jun. 20, 2019 by the same Applicant.

Many advantages can be obtained with the heating system of the invention.

In fact, the heating system of the invention allows to obtain:

high-energy efficiency, limiting heat loss both through the use of absorption wavelengths in predefined bands and through the presence of reflective elements associated with each preform;

a maximum accuracy of the heating profile, as the heating bells 103 create a series of external and internal reflections, studied by virtue of the geometry of the frusto-conical shaped surfaces 112a, 112b, 112c, 112e which leads to the appropriate absorption of radiation and, from here, to an optimal heating of the material with much higher accuracy than the current heating systems with lamps. The temperature distribution and the related gradients, by virtue of the phenomenon of heat deposition directly inside the material obtained by the correct penetration of the selected radiation, allow this invention to offer much higher heating quality than that available now. Finally, the band with highly absorbent treatment 112d placed on the metal cylinder absorbs any residual radiation which may escape from the light ring generated between the surfaces 112a, 112b, 112c, 112e and thus confines the heat generation to the upper part;

as a function of the power of the laser sources used, a heating time up to an order of magnitude lower than in the current systems, which allows a containment of the dimensions of the oven and consequent lower thermal dispersion.

a wide modulability of the heating, both by varying the intensity of the laser source, and by varying the motion of the preform P or the heating bell 103;

an absence of thermal inertia, which allows an instant restart and therefore a better efficiency of the entire production line;

the possibility of modulating the speed of the machine in the operating step as a function of the trend of the production line, a feature currently not available in the ovens on the market, again by virtue of the absence of thermal inertia and by virtue of the variability of the radiation intensity due to the high dynamic response of the laser sources;

the possibility of integrating a UV-C radiation source in the same optical path to pair the disinfection of the preform with the heating;

a substantial reduction in heat dissipation, with the consequence of saving cooling energy to maintain the working environment of the machine at the correct temperature and to avoid very hot surfaces, which are thus potentially dangerous for operators;

a possible reduction in the size of the heating system with respect to the traditional preform ovens, while maintaining the same production capacity;

an absence of ionizing radiation (unless coupled with a UV-C radiation source), as the laser source is monochromatic in the infrared range, which prevents the formation of harmful substances inside the plastic of the preform.

It is apparent that only some particular embodiments of the present invention have been described, to which a person skilled in the art will be able to make all the changes necessary to adapt it to particular applications, without departing from the scope of protection of the present invention.

For example, the heating devices 101 described here can also be inserted in a rotary heating system, such as the one described in Italian patent application no. 102019000012549 of Jul. 22, 2019 in the name of the same Applicant, or in a continuous linear system.

Figure 9:
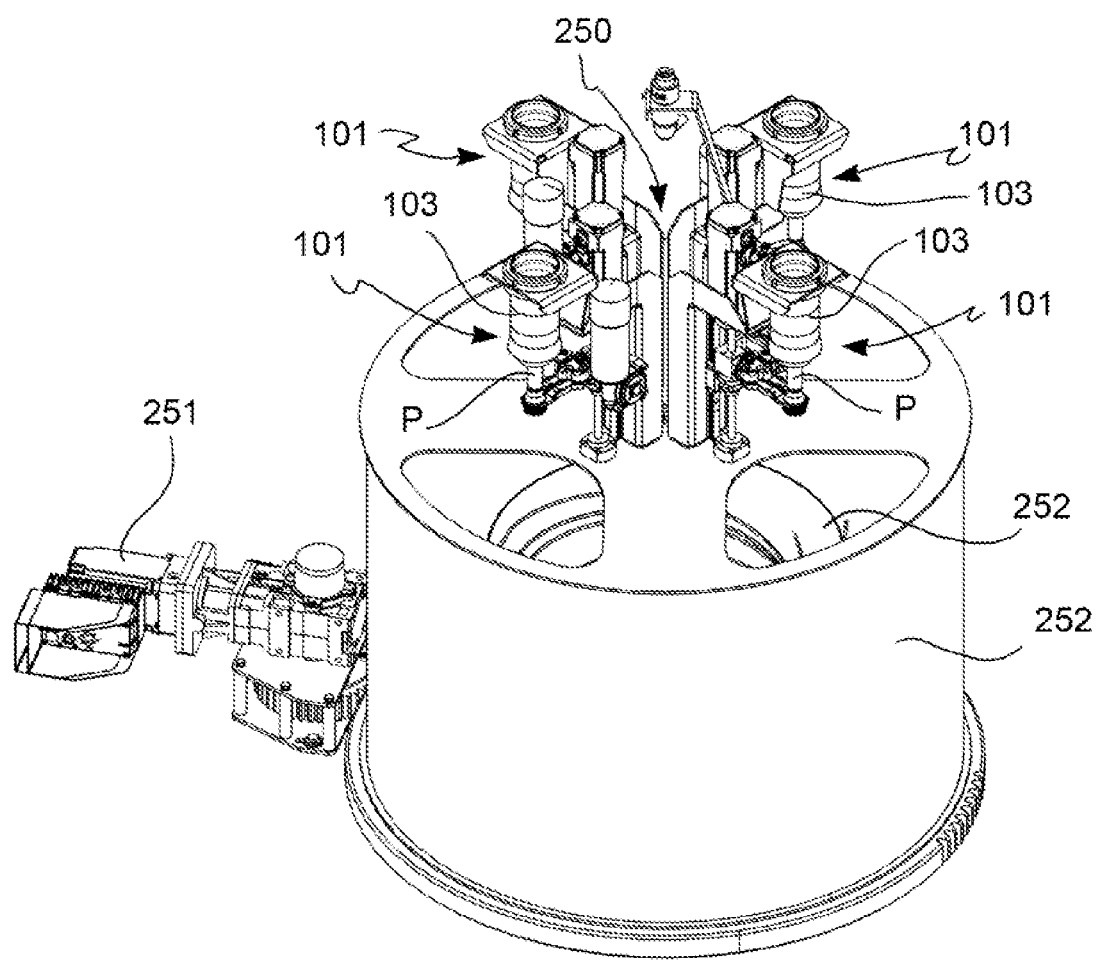
FIG. 9 shows a perspective view of a rotary machine for heating the preforms which comprises the heating devices of FIG. 6.

An example of a rotary system in which the heating devices 101 of the invention are mounted, in particular in the embodiment thereof of FIGS. 6-8, is shown in FIG. 9.

The heating devices 101 are mounted on a carousel 250 rotated by a motorization 251. The lower portion of the carousel is placed in a containment base 252 which also comprises an optical collector 253 connected upstream to a laser source (not seen) and, downstream, to the heating bells 103 as previously described. The carousel 250 is synchronized with the distribution stars (not shown) which move the preforms P into and out of the carousel 250.

What we claim is:

1. A heating device for preforms, configured so as to be positioned outside a preform and radiate an electromagnetic radiation in the infrared range, forming a radiation disk in such a device according to a radial symmetry with respect to the center of the preform axis.

2. The heating device according to claim 1, comprising a plurality of reflective surfaces, each of said reflective surfaces being configured so as to singularly radiate a preform from the outside.

3. The heating device according to claim 1, wherein the electromagnetic radiation is generated by a laser device, for example comprising a device with a diode source, a semiconductor source or a fiber source.

4. The heating device according to claim 3, wherein the electromagnetic radiation emitted by the laser device is comprised in the wavelength range 1620-2100 nm, and/or 1652-1674 nm and/or 1701-1880 nm and/or 1907-1919 nm and/or 1951-2000 nm, and/or 1803-1813 nm and/or 1903-1913 nm and/or 1941-1961 nm and/or 1972-2012 nm and/or 1940-1955 nm; or the electromagnetic radiation has a wavelength of 1661 nm and/or 1721 nm and/or 1908 nm and/or 1951 nm and/or 1992 nm.

5. The heating device according to claim 1, comprising a heating bell, configured to receive a preform therein, and a vertically movable clamp, so as to take a raised position of disengagement of the preform from the heating bell and a lowered position in which the preform is inserted into said heating bell, said clamp being moved by an actuator configured so as to follow a predefined law of motion, said actuator preferably being a stepper motor, a servomotor, a linear motor or a brushless motor.

6. The heating device according to claim 1, comprising a heating bell, configured to receive a preform therein, and a vertically fixed clamp, the heating bell being supported by an arm vertically movable by an actuator configured so as to follow a predefined law of motion, so as to take a raised position in which the preform is inserted into said heating bell and a lowered position, said actuator being a stepper motor, a servomotor, a linear motor or a brushless motor.

7. The heating device according to claim 5, wherein said clamp is supported by a support which is moved by a screw and is guided by low-friction seats, the assembly consisting of the movable clamp, the actuator, the screw and the low-friction seats being mounted on a support structure.

8. The heating device according to claim 6, wherein said arm is moved by a screw and is guided by low-friction seats.

9. The heating device according to claim 1, comprising a heating bell, configured to receive a preform therein, and a clamp, wherein the clamp holds the preform in an overturned condition, i.e., with the preform opening facing downwards, and wherein the heating bell is arranged with the opening facing downwards, the clamp being vertically movable so as to take a lowered position of disengagement of the preform from the heating bell and a raised position in which the preform is inserted into said heating bell, said clamp being moved by an actuator configured so as to follow a predetermined law of motion.

10. The heating device according to claim 9, comprising an overturning member of the preform, from a normal condition with the preform opening facing upwards to an overturned condition and vice versa.

11. The heating device according to claim 1, comprising a sliding member comprising a body in which a spindle for a preform is slidably inserted, the spindle being movable along a vertical direction between a raised position and a lowered position, the sliding member being connected to a heating bell by means of a connecting element, so that the heating bell is positioned below in alignment with the spindle.

12. The heating device according to claim 5, wherein said heating bell comprises a substantially hollow cylindrical body, a conical portion placed at one end of the body, and a reflective portion placed at the opposite end of the body, and comprises an opening coaxial to the longitudinal axis X-X of the heating bell, at the reflective portion, and a collimator member at the end of the conical portion, the collimator member being connected to an optical fiber to deliver a collimated beam of infrared radiation with predetermined wavelengths.

13. The heating device according to claim 12, wherein, downstream of the optical path of the collimator member, the conical portion of the heating bell comprises a first lens or axicon, placed at the end of said conical portion connected to the collimator member, and a second lens or axicon placed in the lower section of the cylindrical body, so as to generate a radiation cylinder with a convenient homogeneity degree.

14. The heating device according to claim 12, wherein the reflective portion comprises a system of frusto-conical reflective surfaces comprising, in sequence from the cylindrical body towards the opening, a first frusto-conical reflective surface flared outwards, a second frusto-conical reflective surface converging towards the longitudinal axis X-X of the heating bell and a third frusto-conical reflective surface converging towards the longitudinal axis X-X, and optionally a fourth frusto-conical reflective surface flared outwards placed between the cylindrical body and the first frusto-conical surface, wherein the first, second, third and, optionally, fourth frusto-conical reflective surface are tilted by an angle $\alpha$, an angle $\beta$, an angle $\gamma$ and an angle $\delta$, respectively, with respect to respective cylindrical surfaces which are coaxial to the axis X-X, wherein angle $\alpha$ is smaller than angle $\beta$ and is greater than or equal to angle $\gamma$, and wherein angle $\delta$ is smaller than angle $\alpha$ and wherein a substantially cylindrical absorbent surface is placed between the body and the first frusto-conical reflective surface.

15. The heating device according to claim 13, wherein the reflective portion comprises a system of frusto-conical reflective surfaces comprising, in sequence from the cylindrical body towards the opening, a first frusto-conical reflective surface flared outwards, a second frusto-conical reflective surface converging towards the longitudinal axis X-X of the heating bell and a third frusto-conical reflective surface converging towards the longitudinal axis X-X, and optionally a fourth frusto-conical reflective surface flared outwards placed between the cylindrical body and the first frusto-conical surface, wherein the first, second, third and, optionally, fourth frusto-conical reflective surface are tilted by an angle $\alpha$, an angle $\beta$, an angle $\gamma$ and an angle $\delta$, respectively, with respect to respective cylindrical surfaces which are coaxial to the axis X-X, wherein angle $\alpha$ is smaller than angle $\beta$ and is greater than or equal to angle $\gamma$, and wherein angle $\delta$ is smaller than angle $\alpha$ and wherein a substantially cylindrical absorbent surface is placed between the body and the first frusto-conical reflective surface.

16. The heating device according to claim 5, comprising a laser source for each heating bell.

17. An oven for preforms, comprising transport means adapted to move the preforms along a path and a plurality of heating devices according to claim 1, so that a heating device corresponds to each preform, the oven being operatively connected to movement means for the preforms, at the inlet and at the outlet of the oven, respectively.

* * * * *